Patented Aug. 21, 1951

2,564,855

UNITED STATES PATENT OFFICE 2,564,855

INSECTICIDAL COMPOSITIONS

Loren L. Neff, Long Beach, and Elvin L. Wampler, Anaheim, Calif., assignors to Union Oil Company of California, Los Angeles, Calif., a corporation of California No Drawing. Application August 7, 1947, Serial No. 767,344

6 Claims. (Cl. 167—14)

This invention relates to compositions suitable for use as pesticides, particularly insecticides comprising beryllium acetylacetone, and like compounds.

Beryllium acetylacetone is a chelate salt of beryllium and acetylacetone, the latter being more particularly describable as 2,4-pentanedione. This is a beta-diketone, and in general only beta-diketones will form the chelate compounds or metal salts of this invention. Many metals will form chelate compounds or salts with the beta-diketones, but although these in general have some value as insecticides, the beryllium compounds have been found to be outstanding. This is particularly unusual, since to applicants' knowledge beryllium compounds in general have not found application as insecticides.

Acetylacetone may be prepared by the acylation of acetone with acetic anhydride. This is a general method of preparing the saturated acyclic beta-diketones, and is described, for example, by Adams and Hauser in the Journal of the American Chemical Society, vol. 67, page 284 et seq., using boron trifluoride as a catalyst. The resulting beta-diketone, such as acetylacetone is reacted readily with a beryllium compound to form the chelate salt as illustrated in the following equation:

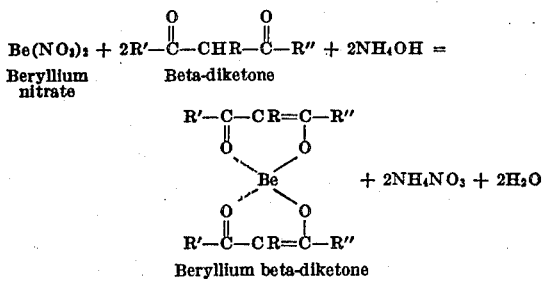

Beryllium beta-diketone

The above equation shows the generalized formula for the beta-diketones of this invention. Thus for the saturated acyclic beta-diketones R, R' and R" are saturated acyclic hydrocarbon groups, though R may also be hydrogen, and where acetylacetone is the beta-diketone employed, R' and R" in the generalized formula are both methyl groups and R is hydrogen. As a specific example of the preparation of the beryllium salt of acetylacetone, an aqueous solution of beryllium nitrate is refluxed with a molecular excess of acetylacetone (more than two mols of acetylacetone per mol of beryllium nitrate). During the refluxing, over a period of about two hours, a sufficient amount of ammonium hydroxide solution is added to make the solution slightly alkaline. The resulting solution is filtered, and the filtrate is concentrated until white needles begin to appear. The solution is then cooled to crystallize the product, which is filtered off and dried. In another example of the preparation, solid beryllium sulfate is mixed with the equivalent quantity of acetylacetone (two mols of the latter to one of the former), and concentrated ammonium hydroxide is gradually added with continuous stirring. A volume of ammonium hydroxide approximately equal to the volume of the acetylacetone is added. Heat is evolved during this addition, and the rate is controlled so that the temperature of the reaction mixture is maintained just below the boiling point. After all the ammonium hydroxide has been added, the mixture is cooled in an ice bath, filtered, and the residue washed with ice water. The residue is then dissolved in ethyl alcohol, filtered hot to remove any beryllium hydroxide present, and the filtrate cooled in an ice bath. The resulting crystals of beryllium acetylacetone when filtered off and air dried exhibit a melting point of 102 to 103° C. Yields of about 80% of theoretical are easily obtained. Entirely analogous methods of preparation are employed to prepare the other beryllium beta-diketone salts of this invention. Thus propionylacetone or 2,4-hexanedione may be prepared by reacting propionic anhydride with acetone; methyl propionylacetone may be prepared by reacting propionic anhydride with methyl ethyl ketone; and methyl propionyl butyrlmethane may be prepared by reacting n-butyric anhydride with diethyl ketone; and these beta-diketones may all be reacted with beryllium compounds to form the beryllium salts as described above. Similarly, the substituent groups R, R' and R" may be cyclic saturated groups such as cyclohexyl, methyl cyclopentyl, and the like. For example, by reacting cyclohexanone with acetic anhydride or butyric anhydride, respectively, 2-acetylcyclohexanone or 2 - butyrylcyclohexanone, respectively, may be prepared and converted to the beryllium salts as above.

The above compounds, and the generalized formula of the equation above are examples of the generalized equation in which R' and R" are both saturated groups. It has been found, however, that the products in which either R' or R" or both are unsaturated or even aromatic in character, have insecticidal value. Thus unsaturated beta-diketones may be prepared by reacting olefins with diketene in the presence of a catalyst. This method of preparation is described in application Serial No. 547,807, now U. S. Patent 2,453,619. As an example, about one mol of diketene and one mol of diisobutylene are mixed and about one-half mol of commercial 95% sulfuric acid is added dropwise to the mixture with vigorous stirring maintaining the temperature below about 100° F. After allowing about an hour to complete the reaction, about 500 ml. of water is added to the reaction vessel to dissolve the catalyst from the product. Two liquid phases are formed, the lower aqueous phase containing the catalyst solution and the upper phase containing the crude diketone. The two phases are separated, the oil phase is washed with water and dilute sodium carbonate solution, and distilled under vacuum. The product diketone is an unsaturated beta-diketone having the formula $C_{12}H_{20}O_2$ and a structure believed to be primarily as follows:

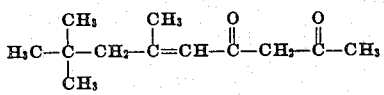

Similar unsaturated beta-diketones may be prepared from other acyclic olefins such as heptene, butene, or mixtures of acyclic olefins such as found in polymer gasoline. The same method of preparation may also be employed to prepare cyclic unsaturated beta-diketones. For example, by employing cyclohexene in place of diisobutylene in the above preparation an unsaturated beta-diketone having the formula $C_{10}H_{12}O_2$ and believed to have the following structure is obtained:

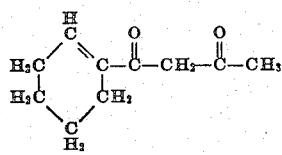

Analogous products may be prepared from other cyclic unsaturated hydrocarbons such as methyl cyclohexene, methyl cyclopentene, and the like, by the same method, and are converted to the beryllium salts as described above for acetylacetone.

Beta-diketones of the above generalized formula in which R' or R'' or both are aromatic in character may also be employed to form the beryllium salts of this invention. Aromatic beta-diketones may be prepared as described in U. S. Patent No. 2,214,117. In this method of preparation diketene is reacted with aromatic hydrocarbons in the presence of aluminum chloride. For example, diketene and benzene form benzoylacetone; and diketene and toluene form the corresponding methylated homolog of benzoylacetone.

All of the above types of beta-diketones may be reacted with beryllium compounds in the manner indicated above, to form beryllium beta-diketones of this invention.

As examples of the use of the beryllium beta-diketone salts of this invention, the following experiments are described:

Example I

Beryllium acetylacetone is suspended in water in a concentration of one gram per 100 ml., the water also containing 0.5% of a commercial wetting agent. Tomato leaves are dipped into the suspension, dried and fed to variegated cutwork larvae. The results are a 76.8% mortality in 24 hours.

Example II

A similar aqueous suspension having a concentration of only 0.5 gram of beryllium acetylacetone per 100 ml. is applied as an aqueous contact spray against the European red mite and the two-spotted mite. The results are 100% mortality of both in 24 hours.

Example III

A contact dust is prepared to contain 25% of beryllium acetylacetone in an inert talc diluent, and this is dusted on adult milkweed bugs (*Oncopeltus fasciatus*). In five hours 90% of the bugs are dead and 10% are moribund. As a comparison with 2,2-bis-parachlorophenyl 1,1,1-trichloroethane (DDT) dust in the same concentration leaves 100% of the bugs alive in the same time.

Example IV

To show the action of beryllium acetylacetone as a fumigant, two grams of the finely ground compound is distributed evenly over the base of a covered 9 cm. Petri dish. Adult milkweed bugs are kept around the dish but out of contact with the compound. After 24 hours 73% of the bugs are dead, the remainder being moribund. A similar test with DDT leaves 100% of the bugs alive.

Example V

To test the effectiveness of beryllium acetylacetone as a soil fumigant, 0.5 gram of beryllium acetylacetone is ground with four grams of an inert aluminum silicate powder, and the resultant powder is thoroughly admixed with 300 grams of damp soil and placed in 15 cm. culture dishes. Wireworm larvae (*Limonius californicus*) were then added to the mixture. After 16 hours all the larvae are dead. As a comparison with a commercial product, benzene hexachloride, employed in the same manner, the latter produces only a 66.7% mortality.

Example VI

The phytocidal characteristics of beryllium acetylacetone are in its favor. Thus in concentrations not greater than about 1%, there is little effect, if any, on growing plants such as tomato plants and squash plants.

Example VII

When tested as in Examples I and II above the beryllium salt of the $C_{12}H_{20}O_2$ acyclic unsaturated beta-diketone, the formula of which is shown above, also shows an effectiveness which is approximately the same as that of the acetylacetone salt.

Example VIII

Similarly the beryllium salt of the $C_{10}H_{12}O_2$ cyclic unsaturated beta-diketone shown above, when employed as in Examples I and II above shows toxicities which are approximately the same as those of the acetylacetone salt. In other respects also the beryllium salts of the beta-diketones of this example and Example VII are excellent pesticides.

It has also been found that the efficacy of the above compounds as contact poisons and fumigants is markedly increased by the admixture therewith of other materials, particularly aryl sulfur compounds such as diphenyl sulfide, diphenyl disulfide, diphenyl disulfoxide, the lower dialkyl benzaldehyde mercaptals such as the methyl to butyl derivatives, and like sulfur compounds. The following examples show the effectiveness of some of these compositions.

*Example IX*

A dual insecticide is prepared by mixing beryllium acetylacetone with diphenyl disulfide. For example, when 0.25 gram of each of these materials is suspended in 100 ml. of water containing 0.25% by weight of a dioctyl ester of succinic acid, a commercial wetting agent, and this suspension is applied as a stomach or contact spray against variegated cutwork larvae, European red mite and cabbage aphis, as in Examples I and II above, 100% mortalities are obtained on all test insects. Thus the mixture has a greater potency than either compound alone. Similar results are obtained with mixtures of beryllium acetylacetone with diphenyl sulfide.

*Example X*

A dual insecticide is prepared by mixing powdered beryllium acetylacetone with about one-tenth its weight of di-secondarybutyl benzaldehyde mercaptal, and incorporating the mixture in an inert talc diluent as in Example III. The product is very effective in killing red spider, being more effective in this respect than similar compositions containing either ingredient alone.

Similar beneficial effects are observed with mixtures of the other acetylacetone salts and sulfur compounds of this invention.

In the above mixtures of beta-diketone salts and sulfur compounds it is essential, where aqueous spray mixtures are employed, to regulate closely the amount of spreading agent incorporated in the product. Thus if too much spreading agent is employed the spray tends to run off the plant too rapidly, leaving little toxicant upon the plant surface; while if too little wetting and spraying agent is employed, the aqueous insecticide tends to cover the plant surface in a splotchy manner which does not give as thorough treatment as desirable. The optimum amount of wetting and spreading agent to be employed in each instance may be readily determined by trial. The amount employed in Example X above appears to be optimum for this combination.

Although specific compounds and specific quantities and test conditions are shown in the above examples, these are only illustrative of the invention. Other compounds of this invention as described previously are also effective in a similar manner, and all of these compounds may be employed in concentrations between about one-tenth and ten times the amount shown above, and still exhibit beneficial effects.

The insecticidal compositions of this invention may be employed in any conventional manner as poisons for pests, and need not be employed in precisely the same manner as employed in the above specific examples. Thus the products may be mixed with other pesticides and applied in the form of solids, as such or mixed with inert solid fillers; or suspended or dissolved in aqueous solutions or suspensions, or oil solutions or suspensions, or emulsions. They may serve not only to destroy pests existing on organic matter such as plants, trees, etc., but also to immunize the organic matter by preventing the pests from approaching or feeding on the organic matter which has been treated with these agents. Thus they may be mixed with a sticky matrix and placed around tree trunks to act as repellants; or mixed in the soil as soil fumigants; or dissolved in suitable solvents and applied as solutions or suspensions or emulsions with spray oils. Suitable emulsifiers, spreaders, wetting agents, and the like, may be employed in the formulation.

Other modifications of the invention which would occur to one skilled in the art are to be included in the scope of the invention as defined in the following claims.

We claim:

1. A pest control composition containing water, a wetting agent, and a pesticidal amount of a beryllium chelate salt of a beta-diketone.

2. A composition according to claim 1 wherein the beryllium salt has the formula:

$$R'-C-CR=C-R''$$
$$\phantom{R'-}\|\phantom{-CR=}|$$
$$\phantom{R'-}O\phantom{-CR=}O$$
$$\phantom{R'-C-CR}\searrow\phantom{C}\swarrow$$
$$\phantom{R'-C-CR=C}Be$$
$$\phantom{R'-C-CR}\nearrow\phantom{C}\nwarrow$$
$$\phantom{R'-}O\phantom{-CR=}O$$
$$\phantom{R'-}\|\phantom{-CR=}|$$
$$R'-C-CR=C-R'$$

wherein R, R' and R" each represents a substituent selected from the group consisting of hydrogen and monovalent hydrocarbon radicals.

3. A composition according to claim 1 wherein the beryllium salt is beryllium acetylacetone.

4. A pest control composition containing an inert powdered carrier and a pesticidal amount of beryllium chelate salt of a beta-diketone.

5. A composition according to claim 4 wherein the beryllium salt has the formula:

$$R'-C-CR=C-R''$$
$$\phantom{R'-}\|\phantom{-CR=}|$$
$$\phantom{R'-}O\phantom{-CR=}O$$
$$\phantom{R'-C-CR}\searrow\phantom{C}\swarrow$$
$$\phantom{R'-C-CR=C}Be$$
$$\phantom{R'-C-CR}\nearrow\phantom{C}\nwarrow$$
$$\phantom{R'-}O\phantom{-CR=}O$$
$$\phantom{R'-}\|\phantom{-CR=}|$$
$$R'-C-CR=C-R''$$

wherein R, R' and R" each represents a substituent selected from the group consisting of hydrogen and monovalent hydrocarbon radicals.

6. A composition according to claim 4 wherein the beryllium salt is beryllium acetylacetone.

LOREN L. NEFF.
ELVIN L. WAMPLER.

REFERENCES CITED

The following references are of record in the file of this patent:

UNITED STATES PATENTS

| Number | Name | Date |
|---|---|---|
| 1,736,448 | Liebknecht | Nov. 19, 1929 |
| 2,098,135 | Daughety | Nov. 2, 1937 |
| 2,149,856 | McKone | Mar. 7, 1939 |
| 2,156,918 | Lyons | May 2, 1939 |
| 2,208,253 | Flenner | July 16, 1940 |
| 2,287,235 | Flint | June 23, 1942 |
| 2,420,928 | Bousquet | May 20, 1947 |

OTHER REFERENCES

Synthetic Organic Chemicals, vol. III, No. 5, July 1934, Eastman Kodak Company, Rochester, New York, "Chelate Compounds."